(12) United States Patent  
Golubovic et al.

(10) Patent No.: US 9,960,545 B2  
(45) Date of Patent: May 1, 2018

(54) USB CABLE WITH THERMAL PROTECTION

(71) Applicant: Littelfuse, Inc., Chicago, IL (US)

(72) Inventors: Boris Golubovic, San Francisco, CA (US); Kunghao Yu, Taipei (TW)

(73) Assignee: Littelfuse, Inc., Chicago, IL (US)

( * ) Notice: Subject to any disclaimer, the term of this patent is extended or adjusted under 35 U.S.C. 154(b) by 0 days. days.

(21) Appl. No.: 15/386,144

(22) Filed: Dec. 21, 2016

(65) Prior Publication Data

US 2018/0097318 A1 Apr. 5, 2018

Related U.S. Application Data

(60) Provisional application No. 62/404,277, filed on Oct. 5, 2016.

(51) Int. Cl.
*H01R 13/713* (2006.01)
*H01R 24/60* (2011.01)
*H01R 107/00* (2006.01)

(52) U.S. Cl.
CPC ......... *H01R 13/7137* (2013.01); *H01R 24/60* (2013.01); *H01R 2107/00* (2013.01)

(58) Field of Classification Search
CPC ................ H02H 5/042; H01L 2924/00; H01L 2924/00014
USPC ............................................. 361/106
See application file for complete search history.

(56) References Cited

U.S. PATENT DOCUMENTS

2013/0107409 A1* 5/2013 McGee ................. H02H 9/041
361/91.1

* cited by examiner

*Primary Examiner* — Dharti Patel (57) ABSTRACT

A universal serial bus (USB) cable including a power conductor configured to transmit power between a first device and a second device, a configuration channel (CC) conductor configured to allow the first device and the second device to determine whether a connection has been established via the USB cable, and a first positive temperature coefficient (PTC) element coupled to the CC conductor and configured to mitigate current flowing through the CC conductor if a temperature of the first PTC element rises above a predefine trip temperature.

20 Claims, 10 Drawing Sheets

USB CABLE WITH THERMAL PROTECTION

CROSS REFERENCES TO RELATED APPLICATIONS

This application claims the benefit of U.S. Provisional Patent Application No. 62/404,277, filed Oct. 5, 2016, which is incorporated by reference herein in its entirety.

FIELD OF THE DISCLOSURE

This disclosure relates generally to the field of circuit protection devices, and relates more particularly to a universal serial bus cable with integrated thermal protection.

BACKGROUND OF THE DISCLOSURE

Universal serial bus (USB) cables are increasingly used to deliver power to electronic devices in addition to their more traditional role of facilitating data communication. With the recent advent of the USB-C standard, USB cables can now deliver up to 100 Watts of power, thus facilitating high power applications that were previously unachievable via USB connection. However, it has been observed that the delivery of such high power can result in thermal damage to USB cables, especially in cases where the pins of a USB cable are dirty, bent, or otherwise predisposed to suboptimal connectivity.

One technique that has been employed for protecting against overcurrent/overheating in USB cables is the installation of a positive temperature coefficient (PTC) element in series with the power carrying conductors of a USB cable, wherein the PTC element has a resistance that increases as the temperature of the PTC element increases. Thus, as current passing through the PTC element increases above a predefined limit, the PTC element may heat up, causing the resistance of the PTC element to increase and drastically reduce or arrest the flow of current through the USB cable. Damage that would otherwise result from unmitigated fault currents flowing through the USB cable is thereby prevented.

While the above-described application of PTC elements in USB cables has provided a practical solution for protecting against overcurrents and overheating in earlier, lower-power (e.g., 5-20 watt) generations of USB cables, similar applications in modern, USB-C standard cables presents significant challenges. Particularly, a PTC element capable of handling 100 watts of power is prohibitively large and expensive for practical commercial application in a USB cable.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a cable in accordance with the present disclosure may include a power conductor configured to transmit electrical power between a first device and a second device, a first data conductor configured to transmit data between the first device and the second device, and a first positive temperature coefficient (PTC) element coupled to the first data conductor and configured to mitigate current flowing through the first data conductor if a temperature of the first PTC element rises above a predefined first trip temperature.

An exemplary embodiment of a system for over-temperature protection in a cable in accordance with the present disclosure may include a first device and a second device connected to one another by the cable, wherein the cable includes a power conductor configured to transmit electrical power between the first device and the second device, a first data conductor configured to transmit data between the first device and the second device, and a first positive temperature coefficient (PTC) element coupled to the first data conductor and configured to mitigate current flowing through the first data conductor if a temperature of the first PTC element rises above a predefined first trip temperature, wherein at least one of the first device and the second device is configured to reduce an amount of electrical power transmitted via the power conductor upon mitigation of the current flowing through the first data conductor.

DETAILED DESCRIPTION

A data/power transmission cable with integrated thermal protection in accordance with the present disclosure will now be described more fully with reference to the accompanying drawing, in which preferred embodiments of the cable are presented. The cable may, however, be embodied in many different forms and may be configured to conform to various standards (e.g., IEEE standards) and should not be construed as being limited to the embodiments set forth herein. Rather, these embodiments are provided so that this disclosure will be thorough and complete, and will convey the scope of the cable to those skilled in the art.

Figure 1:
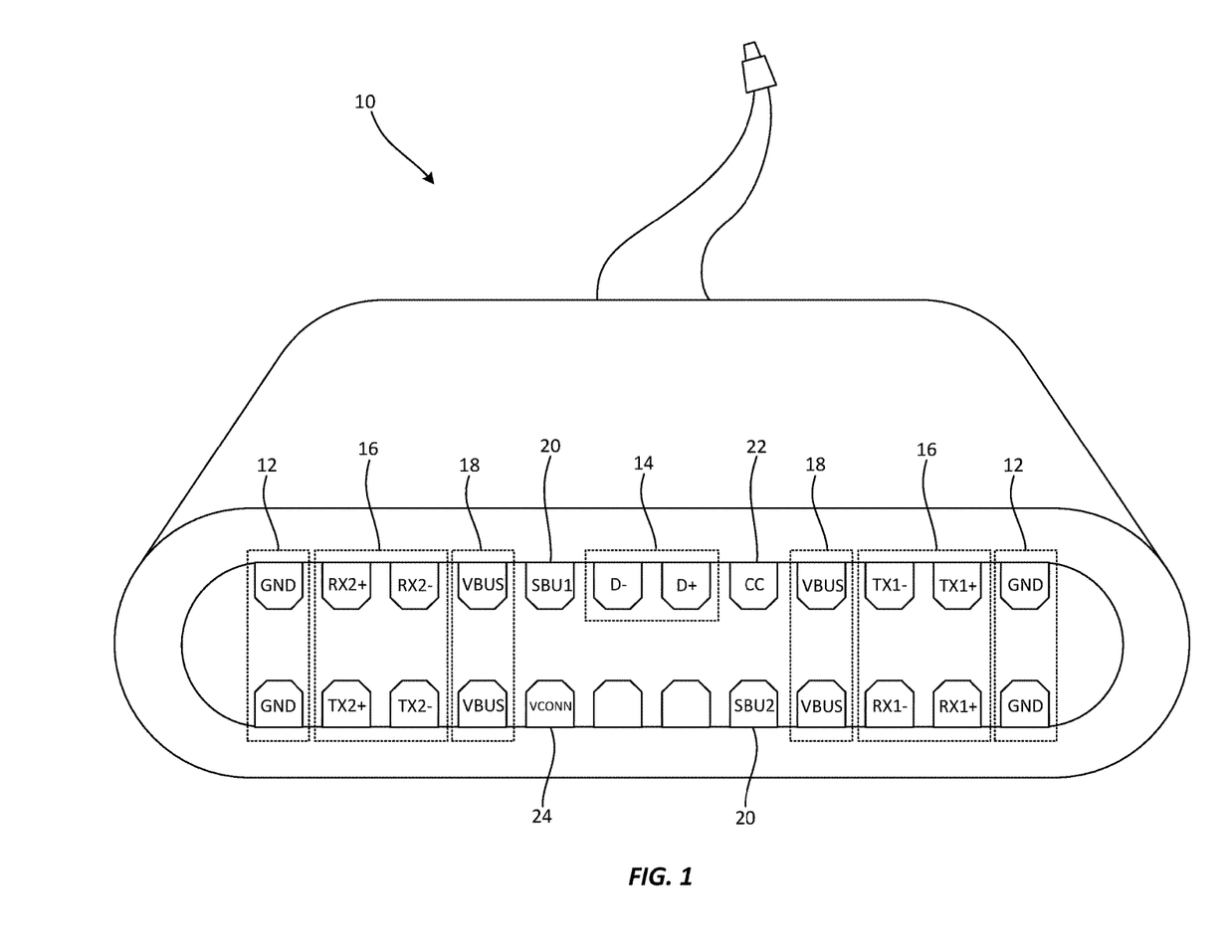
FIG. 1 is schematic diagram illustrating a pin layout of an exemplary embodiment of a cable in accordance with the present disclosure.

Referring to FIG. 1, a schematic diagram illustrating a pin layout for a USB-C data/power transmission cable 10 (herein after "the cable 10") in accordance with the present disclosure is shown. As dictated by the USB-C standard, the cable 10 includes ground conductors 12, high speed (USB 2.0, 480 mbps) data conductors 14, super speed+ (USB 3.1, 10 Gbps) data conductors 16, power conductors 18, sideband use conductors 20, a configuration channel conductor 22 (hereinafter "the CC conductor 22"), and a Vconn conductor 24. Of particular relevance to the present disclosure are the power conductors 18, the CC conductor 22, and the Vconn conductor 24.

As will be familiar to those of ordinary skill in the art, the CC conductor 22 allows devices that are connected by the cable 10 to determine whether the devices are, in-fact, connected to each other via the cable 10 and to transmit power and/or data over the cable 10 based on such determination. Specifically, if a device to which the cable 10 is connected detects a predetermined resistance on the CC conductor 22, such resistance being indicative of a valid connection with another device on the opposing end of the cable 10, then the device may transmit data and/or power over appropriate conductors of the cable 10. Conversely, if the device fails to detect a predetermined resistance on the CC conductor 22, indicating the lack of a valid connection with a device on the opposing end of the cable 10, then the device will not transmit data or power over the cable 10. The function of the CC conductor 22 as it relates to the embodiments of the present disclosure will be discussed in greater detail below.

Figure 2A:
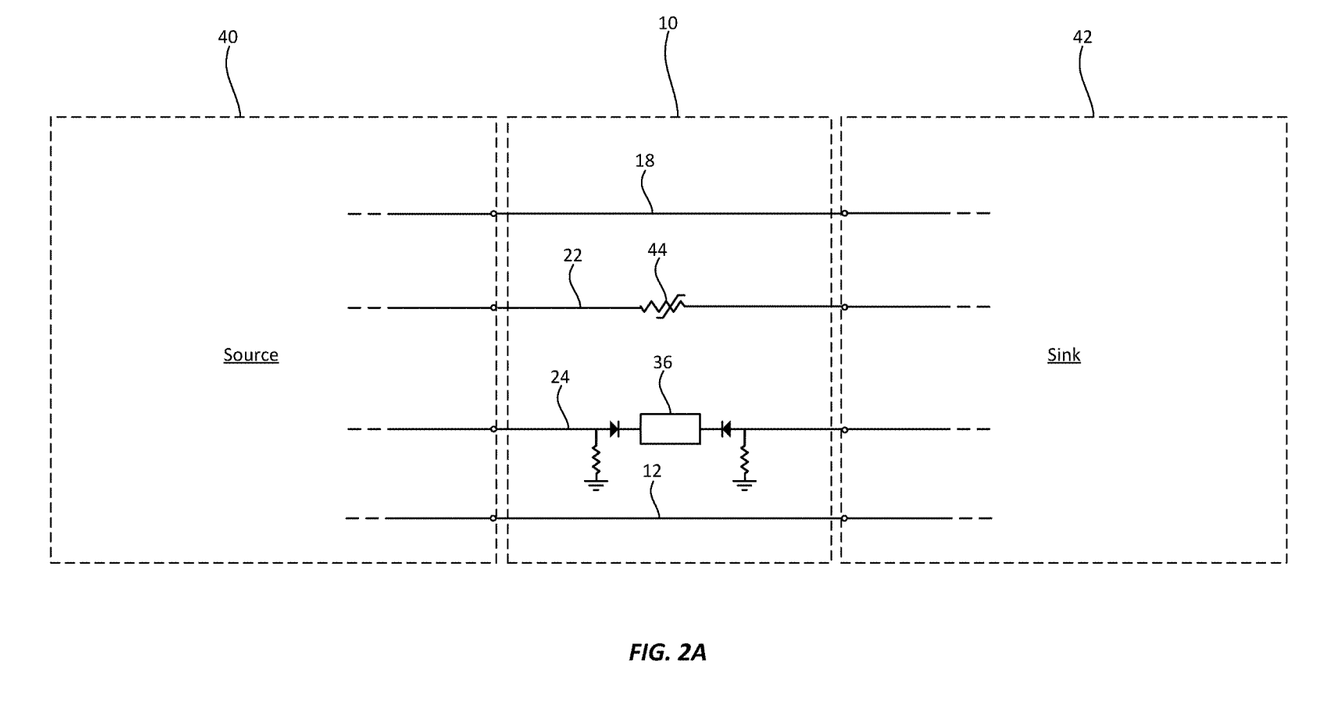
FIG. 2A is schematic diagram illustrating portions of the cable shown in FIG. 1 connected to a pair of devices.

As will also be familiar to those of ordinary skill in the art, the Vconn conductor 24 is used to dictate high power (e.g., >20 watts, and typically 100 watts) operation of the cable 10. Specifically, the Vconn conductor 24 includes an integrated circuit (IC) 36 (see FIG. 2) provided with logic that is configured to indicate to connected devices that the cable 10 is capable of handling high power transmission. For example, if a device that is connected to the cable 10 determines from the IC 36 that the cable 10 is configured to handle high power, the device may subsequently transmit high power over the cable 10 via the power conductors 18. Conversely, if the connected device does not receive an indication that the cable 10 is configured to handle high power, the device will not transmit high power over the cable 10 and will instead only transmit low power (e.g., 5-20 watts) over the cable 10 via the power conductors 18. The determination of whether to transmit high power or only low power over the cable 10 is made by a device only upon initial connection of the cable 10 to the device.

Referring now to FIG. 2A, a schematic diagram illustrating the CC conductor 22, the Vconn conductor 24, one of the power conductors 18, and one of the ground conductors 12 of the cable 10 connected to a source device 40 and to a sink device 42 (hereinafter "the source 40" and "the sink 42") is shown. It will be understood that the power conductor 18 and the ground conductor 12 shown in FIG. 2A are representative of all of the power conductors 18 and ground conductors 12 of the cable 10 shown in FIG. 1. The CC conductor 22 may include a positive temperature coefficient (PTC) element 44 connected inline therewith (e.g., via thermal bonding) such that the PTC element 44 is electrically in series with the source 40 and the sink 42 when the cable 10 is connected therebetween. The PTC element 44 may be formed of any type of PTC material (e.g., polymeric PTC material, ceramic PTC material, etc.) configured to have an electrical resistance that increases as the temperature of the PTC element 44 increases. Particularly, the PTC element 44 may be configured to have a predetermined "trip temperature" above which the electrical resistance of the PTC element 44 rapidly and drastically increases (e.g., in a nonlinear fashion) in order to substantially arrest current passing through the CC conductor 22. In a non-limiting, exemplary embodiment of the cable 10, the PTC element 44 may have a trip temperature in a range of 176 degrees Fahrenheit to 230 degrees Fahrenheit.

Figure 2B:
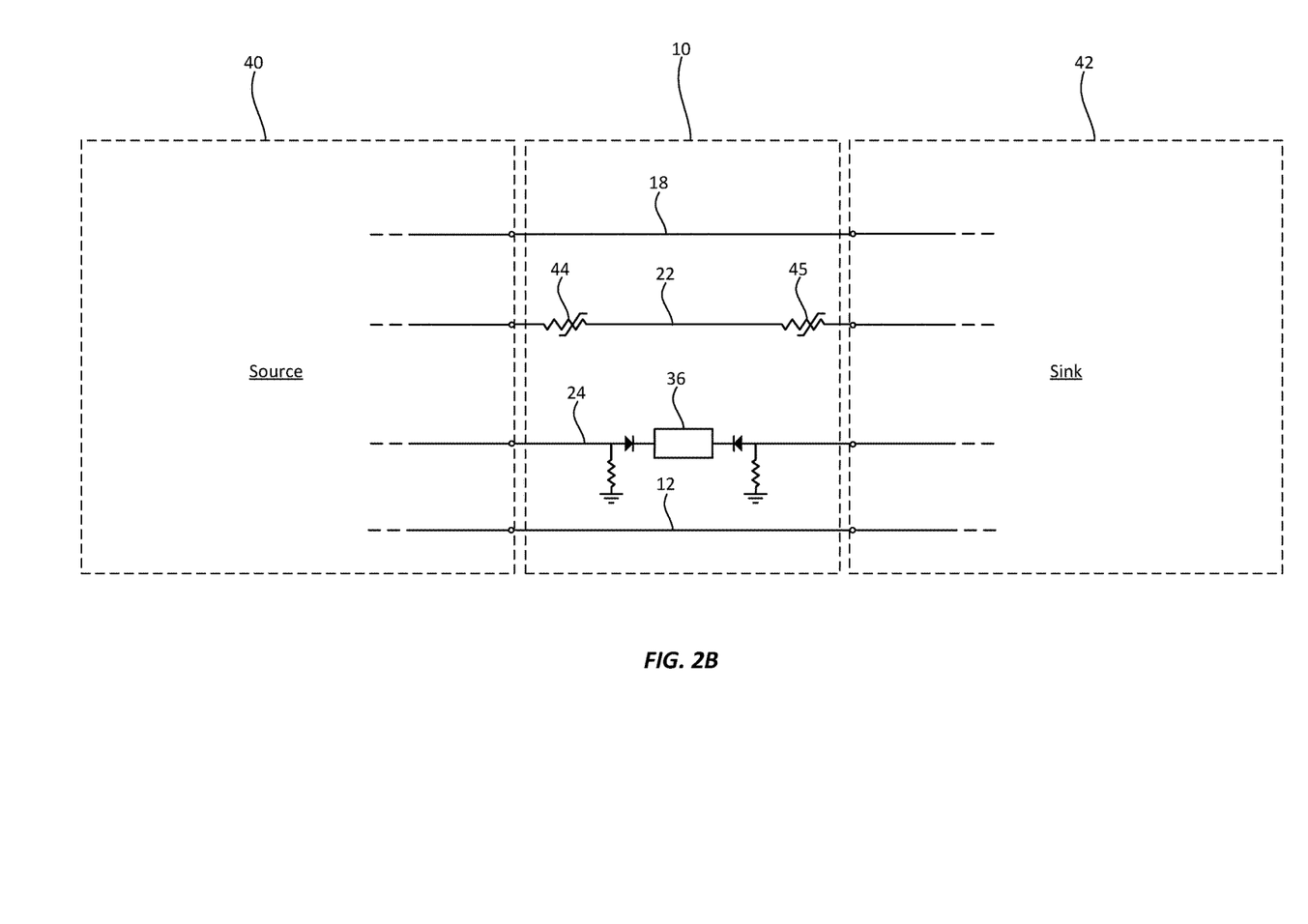
FIG. 2B is schematic diagram illustrating portions of an alternative embodiment of the cable shown in FIG. 2A.
Figure 2C:
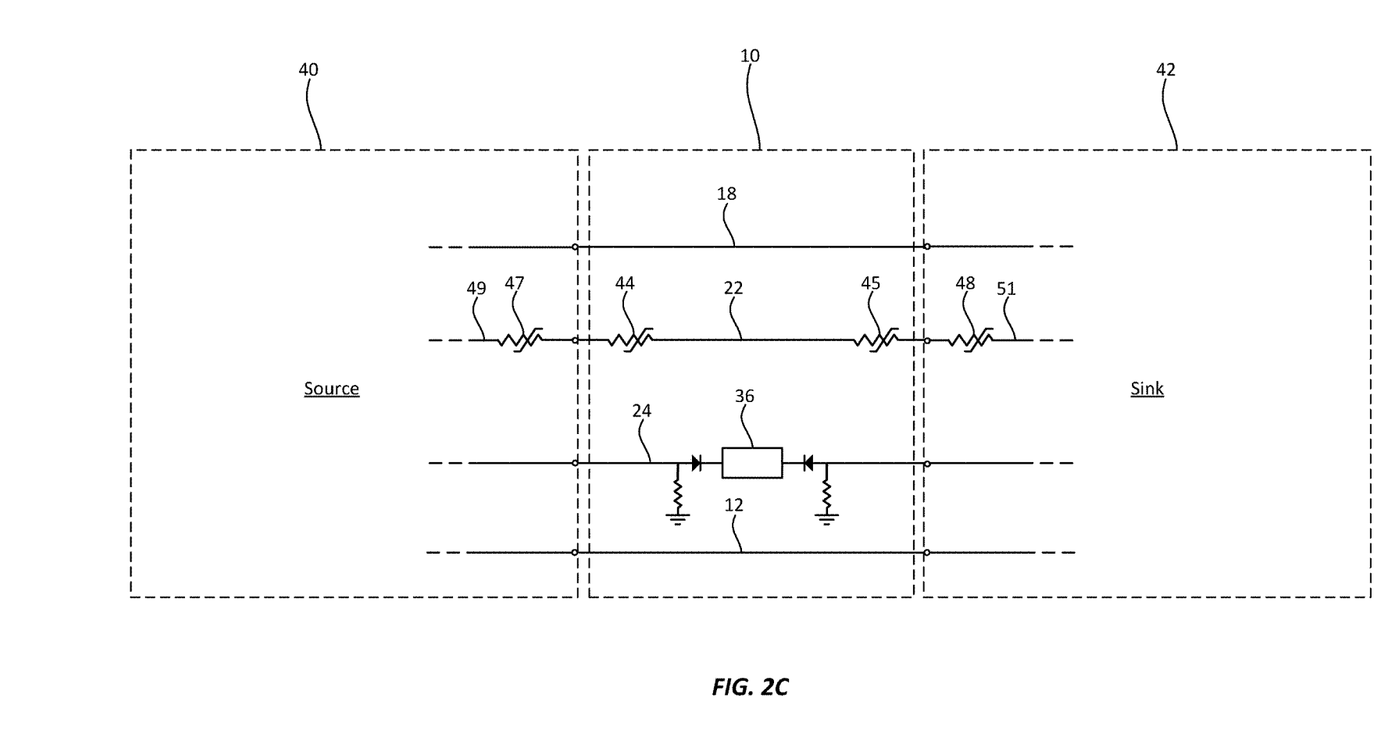
FIG. 2C is schematic diagram illustrating portions of another alternative embodiment of the cable shown in FIG. 2A.

While the CC conductor 22 is shown as having only a single PTC element 44 coupled thereto, embodiments of the cable 10 are contemplated in which a plurality of PTC elements are implemented on the CC conductor 22. For example, referring to FIG. 2B, the cable 10 may include one PTC element 44 on the CC conductor 22 adjacent one end of the cable 10 (e.g., the end connected to the source 40) and a second PTC element 45 on the CC conductor 22 adjacent the opposing end of the cable 10 (e.g., the end connected to the source 42). Additionally, or alternatively, referring to FIG. 2C, it is contemplated that PTC elements 47, 48 may be implemented on one or both of the CC conductors 49, 51 of the source 40 and the sink 42 that are connected to the CC conductor 22 of the cable 10, wherein the PTC elements 47, 48 function in a manner identical to the PTC element 44 described above to provide the cable 10, the source 40, and the sink 42 with thermal protection as further described below.

During operation of the cable 10, if the temperature of the PTC element 44 increases above its trip temperature, such as may result from an overcurrent condition in the cable 10 or from exposure to an external heat source (e.g., the sun, a hot computer chassis, etc.), the PTC element 44 may exhibit high electrical resistance and may arrest current flowing through the CC conductor 22. Thus, the CC conductor 22 will appear to the source 40 and to the sink 42 to be "open" (i.e., disconnected), thereby causing the source 40 and the sink 42 to cease transmitting data and power via the cable 10. Subsequently, when the PTC element 44 cools down to a temperature below its trip temperature and becomes electrically conductive again, the CC conductor 22 will appear to the source 40 and to the sink 42 to be "closed" (i.e., connected), and the source 40 and the sink 42 will resume transmitting data and/or power via the cable 10. The PTC element 44 thus acts as a resettable fuse that mitigates overheating in the cable 10 to prevent thermal damage. Advantageously, since the PTC element 44 is implemented on the CC conductor 22 and not on the power conductor 18, the PTC element 44 need only be rated to hold nominal electrical currents (e.g., 330 microamps) transmitted on the CC conductor 22 regardless of the amount of current transmitted on the power conductor 18 (e.g., 5 amps). The PTC element 44 may therefore be small and inexpensive, making the cost and the size of the cable 10 commercially practical.

Figure 3A:
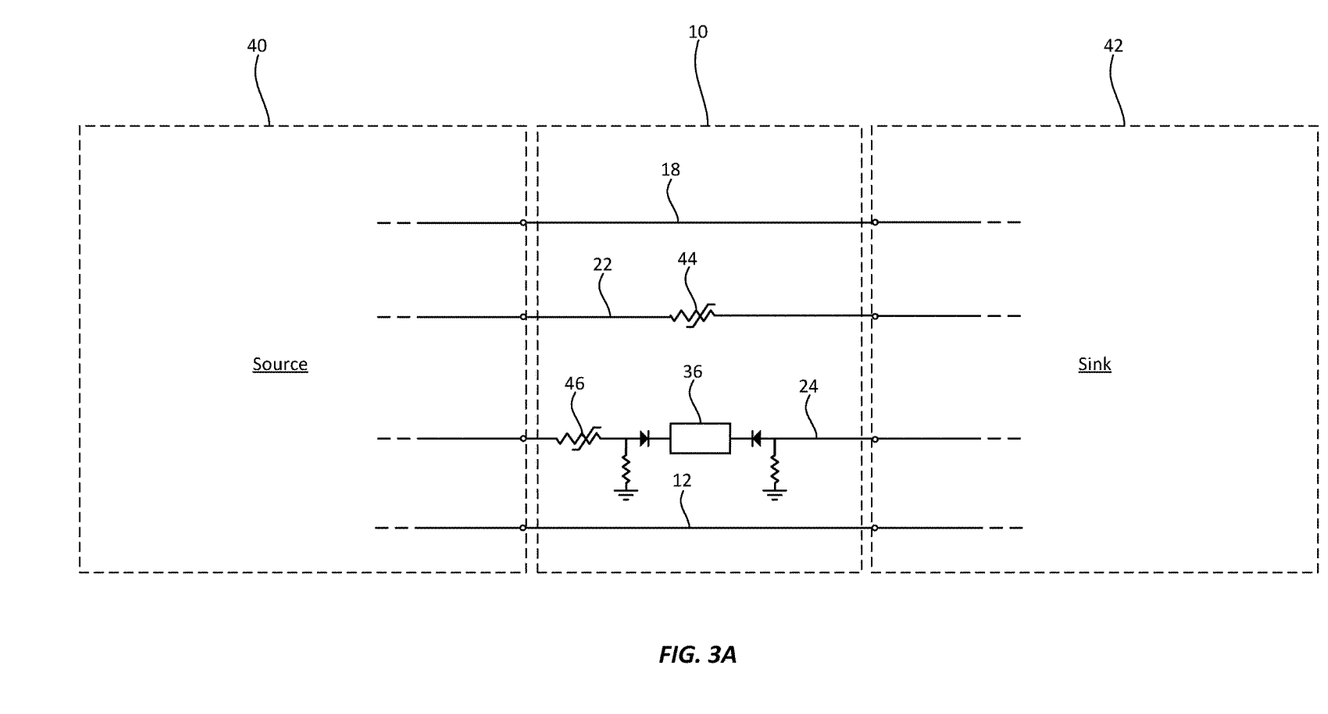
FIG. 3A is schematic diagram illustrating portions of an alternative embodiment of the cable shown in FIG. 1 connected to a pair of devices.

Referring now to FIG. 3A, an embodiment of the cable 10 is shown in which a second PTC element 46 is implemented on the Vconn conductor 24 (e.g., via thermal bonding to the Vconn conductor 24). As with PTC element 44 described above, the PTC element 46 may be configured to have an electrical resistance that increases as the temperature of the PTC element 46 increases. Particularly, the PTC element 46 may be configured to have a predetermined "trip temperature" at which the electrical resistance of the PTC element 46 rapidly and drastically increases (e.g., in a nonlinear fashion) in order to substantially arrest current passing through the Vconn conductor 24. In a non-limiting, exemplary embodiment of the cable 10, the trip temperature of the PTC element 46 may be lower than that of the PTC element 44 described above and may be in a range of 176 degrees Fahrenheit to 230 degrees Fahrenheit.

Figure 3B:
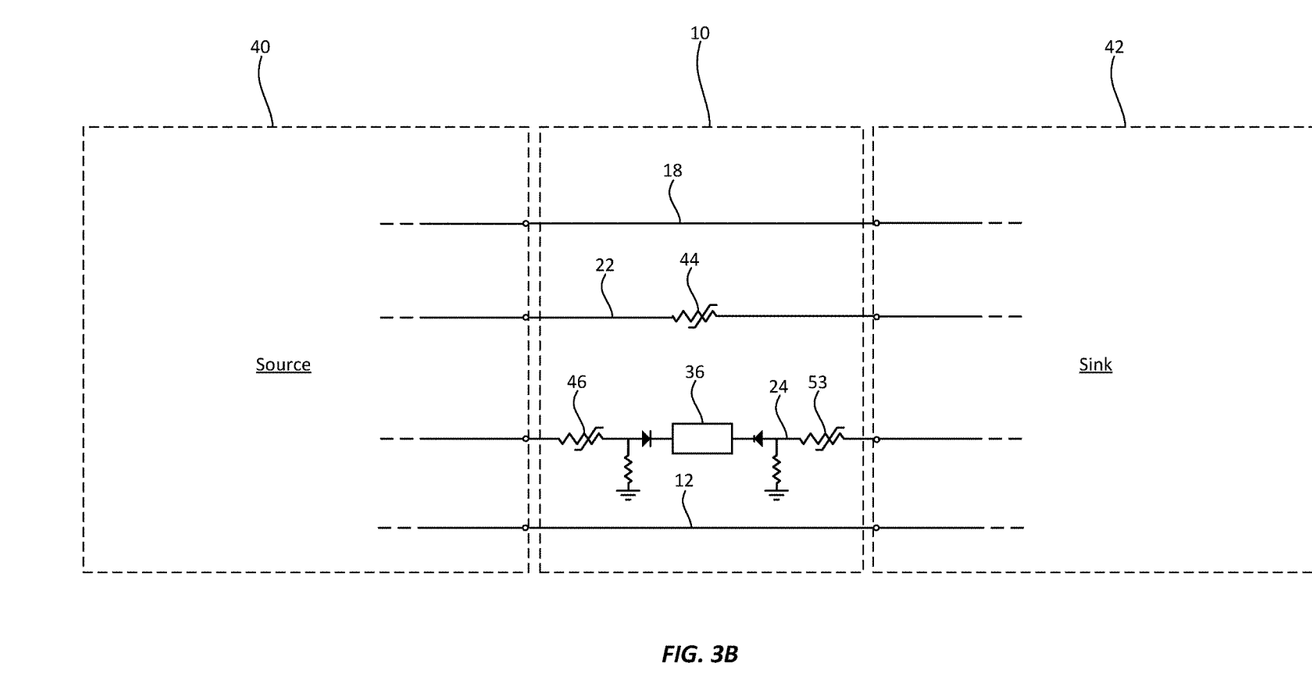
FIG. 3B is schematic diagram illustrating portions of an alternative embodiment of the cable shown in FIG. 3A.
Figure 3C:
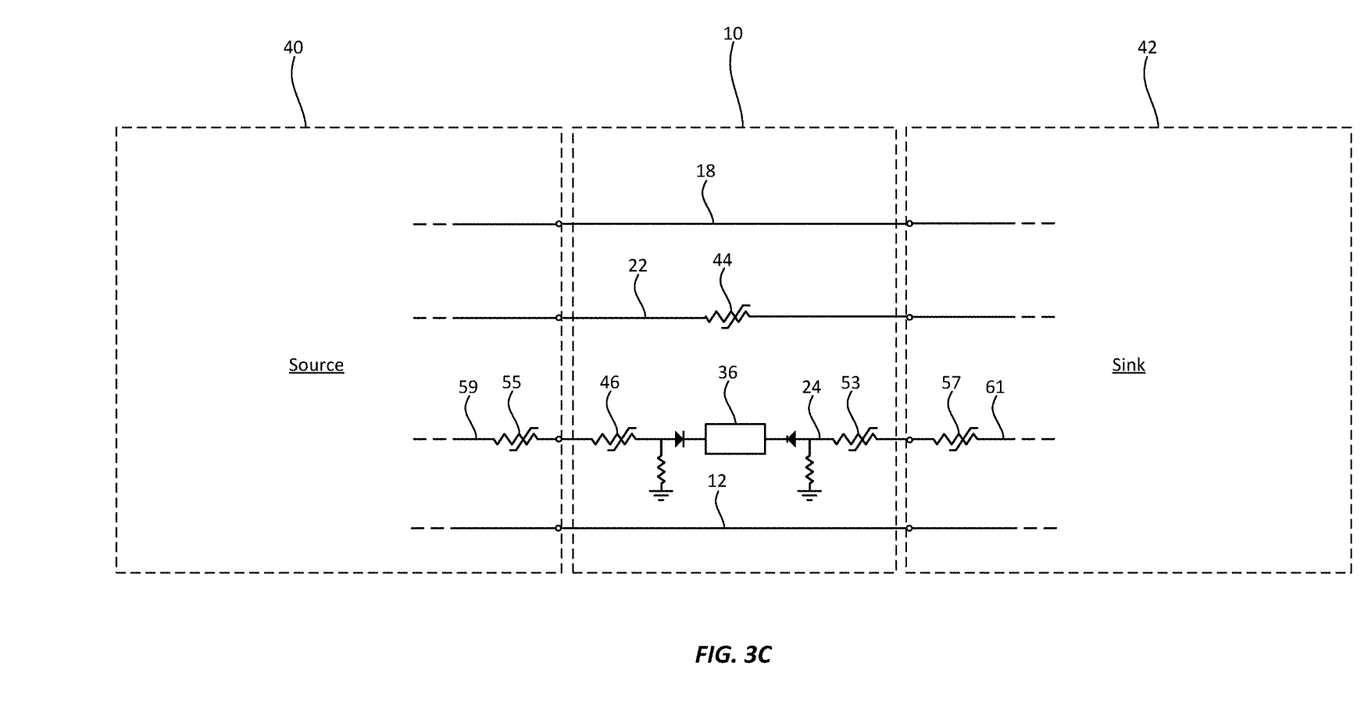
FIG. 3C is schematic diagram illustrating portions of another alternative embodiment of the cable shown in FIG. 3A.

While the Vconn conductor 24 is shown as having only a single PTC element 46 coupled thereto, embodiments of the cable 10 are contemplated in which a plurality of PTC elements are implemented on the Vconn conductor 24. For example, referring to FIG. 3B, the cable 10 may include one PTC element 46 on the Vconn conductor 24 adjacent one end of the cable 10 (e.g., the end connected to the source 40) and a second PTC element 53 on the Vconn conductor 24 adjacent the opposing end of the cable 10 (e.g., the end connected to the source 42). Additionally, or alternatively, referring to FIG. 3C, it is contemplated that PTC elements 55, 57 may be implemented on one or both of the Vconn conductors 59, 61 of the source 40 and the sink 42 that are connected to the Vconn conductor 24 of the cable 10, wherein the PTC elements 55, 57 function in a manner identical to the PTC element 46 described above to provide the cable 10, the source 40, and the sink 42 with thermal protection as further described below.

The PTC element 46 may serve to prevent high power operation of the cable 10 in high temperature conditions which may present an increased risk of thermal damage to the cable 10 if high power operation were allowed. For example, if, prior to connecting the cable 10 to the source 40 and the sink 42, the cable 10 has been exposed to high temperatures (e.g., as a result of sitting out in the sun), the temperature of the PTC element 46 may be above its trip temperature. If the UCB cable 10 is then connected to the source 40 and to the sink 42 while the PTC element 46 is still "tripped," it will appear to one or both the source 40 and sink 42 that the Vconn conductor 24 is open, and the source and/or the sink 40, 42 will only transmit low power on the power conductor 18. As described above, the trip temperature of the PTC element 46 may be lower than the trip temperature of the PTC element 44 so that low power operation of cable 10 may be permitted (i.e., the CC conductor 22 will remain closed) at temperatures that would present an increased risk of thermal damage to the cable 10 if the cable 10 were allowed to transmit high power.

It will be appreciated that the configuration of the cable 10 described above can be similarly applied to power/data transmission cables that conform to standards other than USB-C. For example, the above-described configuration, which includes a PTC element implemented on a configuration channel conductor of a USB cable for dictating the delivery of power on a separate power conductor of the USB cable, can be similarly implemented in cables that conform to the Apple Lightning standard, the Apple Thunderbolt standard, various generations of the Qualcomm Quick Charge standard, and earlier USB standards. In data/power transmission cables that do not have a direct equivalent to the configuration channel conductors of the USB-C standard (e.g., cables that conform to various generations of the Qualcomm Quick Charge standard), it is contemplated that the data lines of such cables can be utilized in the manner of the CC conductor 22 and the Vconn conductor 24 described above when such cables are being used in a charging-only capacity (an example of such an embodiment is described below). More generally, it is contemplated that the functionality of the cable 10 described above can be similarly achieved in any data/power transmission cable that conforms to existing or future protocols by putting a PTC element on one or more "non-power-carrying" conductors of such cables, where such conductors are used to detect the presence of a source/sink connection and/or a level of charging voltage/current. The embodiments of the present disclosure are not limited in this regard.

Figure 4A:
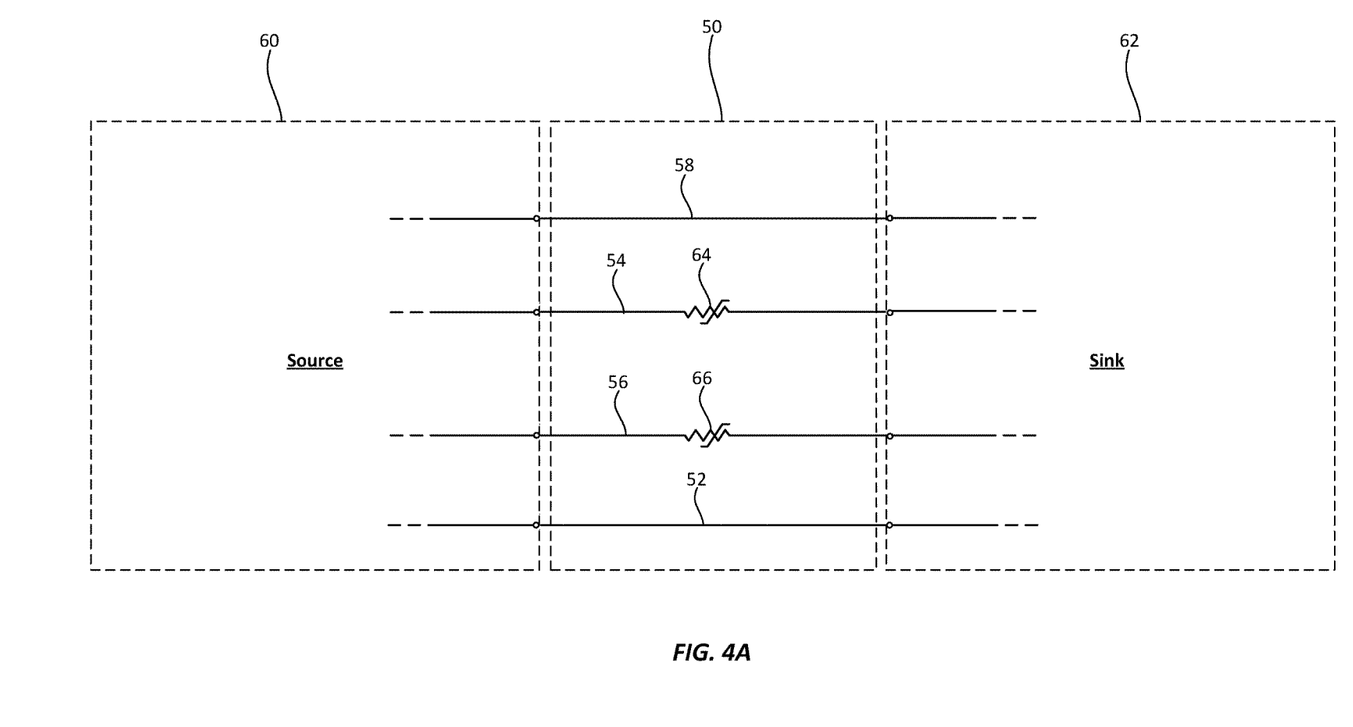
FIG. 4A is schematic diagram illustrating an exemplary embodiment of another cable in accordance with the present disclosure connected to a pair of devices.

Referring to FIG. 4A, a schematic diagram illustrating a non-limiting, exemplary embodiment of a Qualcomm Quick Charge 2.0 cable 50 (hereinafter "the cable 50") in accordance with the present disclosure is shown. As dictated by the Qualcomm Quick Charge 2.0 standard, the cable 50 includes a ground conductor 52, a D+ data conductor 54, a D− data conductor 56, and a power conductor 58. In a typical application, the cable 50 may be used to connect a source device 60 (e.g., a source of electrical power) to a sink device 62 that is being charged (hereinafter "the source 60" and "the sink 62") as shown.

As will be familiar to those of ordinary skill in the art, the cable 50 may be used to selectively transmit power at one of several different voltage levels (5V, 9V, 12V, or 20V) from the source 60 to the sink 62, wherein the voltage level is dictated by the sink 62. Particularly, if the sink 62 requires power at 5V, the sink 62 will apply 0.6V on the D+ data conductor 54 and will pull the D− data conductor 56 to ground, which causes the source 60 to apply 5V on the power conductor 58. If the sink 62 requires power at 9V, the sink 62 will apply 3.3V on the D+ data conductor 54 and will apply 0.6V on the D− data conductor 56, which causes the source 60 to apply 9V on the power conductor 58. If the sink 62 requires power at 12V, the sink 62 will apply 0.6V on the D+ data conductor 54 and will apply 0.6V on the D− data conductor 56, which causes the source 60 to apply 12V on the power conductor 58. If the sink 62 requires power at 20V, the sink 62 will apply 3.3V on the D+ data conductor 54 and will apply 3.3V on the D− data conductor 56, which causes the source 60 to apply 20V on the power conductor 58. If one or both of the D+ data conductor 54 and the D− data conductor 56 appears to the source 60 to be disconnected or "open," the source 60 will default to low power operation and will apply 5V on the power conductor 58.

In accordance with the present disclosure, each of the D+ data conductor 54 and the D− data conductor 56 may include a positive temperature coefficient (PTC) element 64, 66 connected inline therewith (e.g., via thermal binding) such that the PTC elements 64, 66 are electrically in series with the source 60 and the sink 62 during use of the cable 50. The PTC elements 64, 66 may be formed of any type of PTC material (e.g., polymeric PTC material, ceramic PTC material, etc.) configured to have electrical resistances that increase as the temperatures of the PTC elements 64, 66 increase. Particularly, the PTC elements 64, 66 may be configured to have predetermined "trip temperatures" above which the electrical resistances of the PTC elements 64, 66 rapidly and drastically increase (e.g., in a nonlinear fashion) in order to substantially arrest currents passing through the D+ data conductor 54 and the D− data conductor 56. In a non-limiting, exemplary embodiment of the cable 50, the PTC element 64, 66 may have a trip temperature in a range of 176 degrees Fahrenheit to 230 degrees Fahrenheit. While the D+ data conductor 54 and the D− data conductor 56 are each shown as having only a single PTC element 64, 66 coupled thereto, embodiments of the cable 50 are contemplated in which a plurality of PTC elements are implemented on one or both of the D+ data conductor 54 and the D− data conductor 56. For example, the cable 10 may include PTC elements on the D+ data conductor 54 and the D− data conductor 56 adjacent one end of the cable 50 as well as PTC elements on the D+ data conductor 54 and the D− data conductor 56 adjacent the opposing end of the cable 50.

Figure 4B:
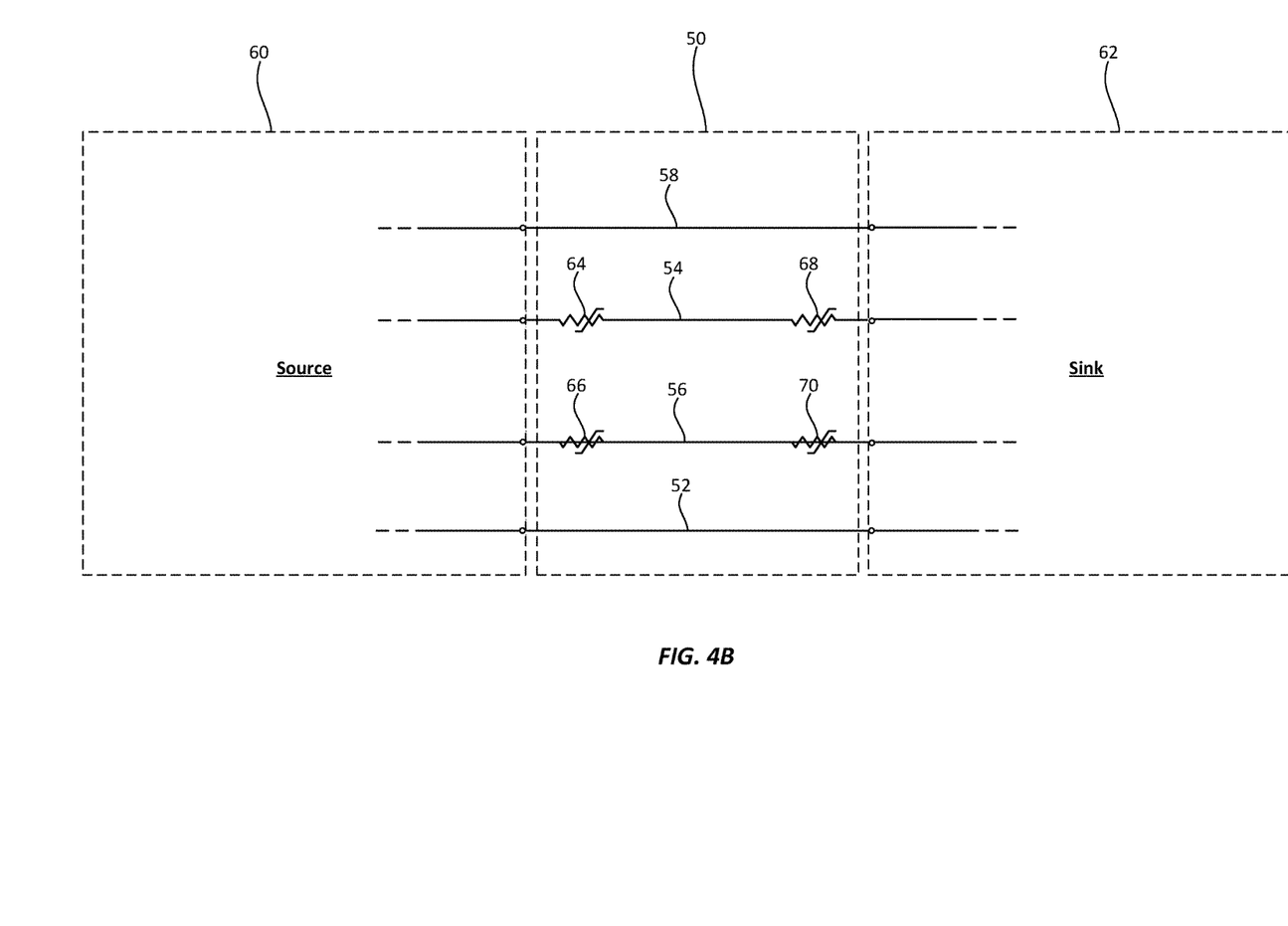
FIG. 4B is schematic diagram illustrating portions of an alternative embodiment of the cable shown in FIG. 4A.
Figure 4C:
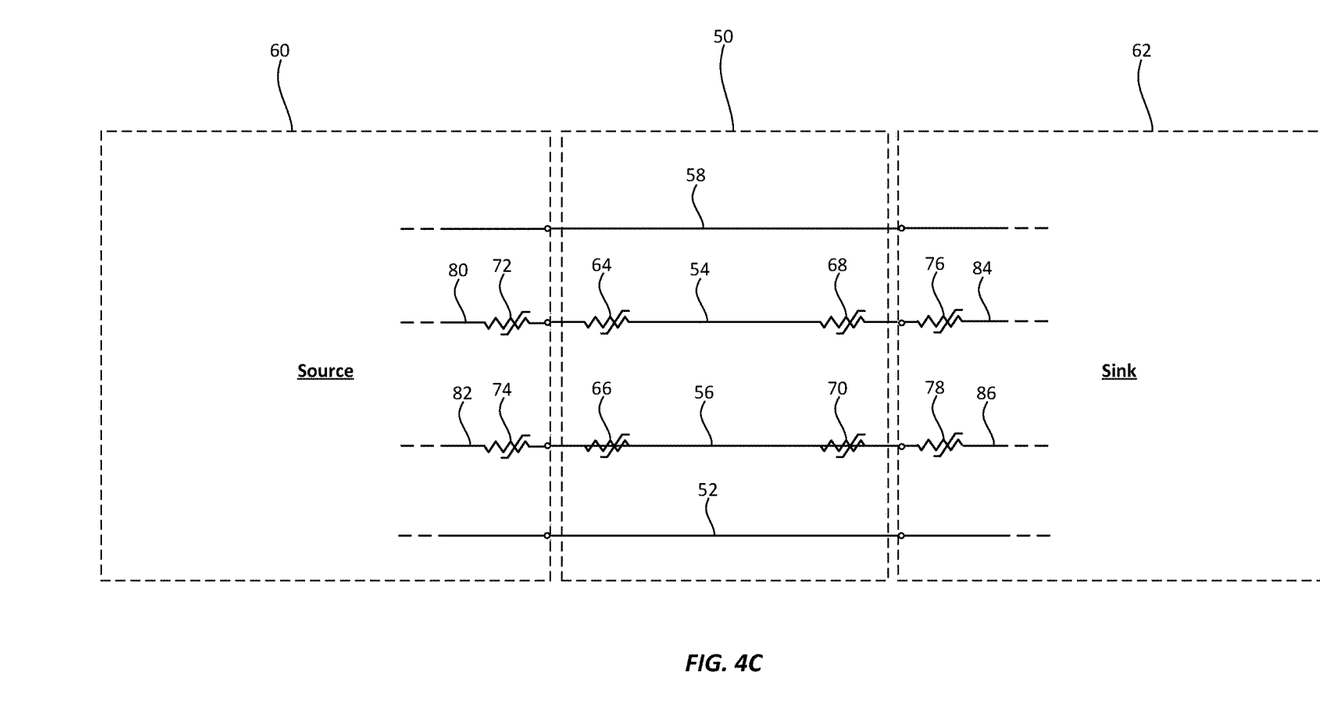
FIG. 4C is schematic diagram illustrating portions of another alternative embodiment of the cable shown in FIG. 4A.

While the D+ data conductor 54 and the D− data conductor 56 are each shown as having only a single PTC element 64, 66 coupled thereto, embodiments of the cable 50 are contemplated in which a plurality of PTC elements are implemented on one or both of the D+ data conductor 54 and the D− data conductor 56. For example, referring to FIG. 4B, the cable 50 may include respective PTC elements 64, 66 on the D+ data conductor 54 and the D− data conductor 56 adjacent one end of the cable 50 (e.g., the end connected to the source 40) as well as respective PTC elements 68, 70 on the D+ data conductor 54 and the D− data conductor 56 adjacent the opposing end of the cable 50 (e.g., the end connected to the source 42). Additionally or alternatively, referring to FIG. 4C, it is contemplated that respective PTC elements 72, 74, 76, 78 may be implemented on one or both of the D+ data conductor 80 and the D− data conductor 82 of the source 40 and/or on one or both of the D+ data conductor 84 and the D− data conductor 86 of the sink 42 that are connected to the D+ data conductor 54 and the D− data conductor 56 of the cable 50, wherein the PTC elements 72, 74, 76, 78 function in a manner identical to the PTC elements 64, 66 described above to provide the cable 50, the source 60, and the sink 22 with thermal protection as further described below.

During operation of the cable 50, if the temperature of the PTC element 64 and/or the PTC element 66 increases above its trip temperature, such as may result from an overcurrent condition in the cable 50 or from exposure to an external heat source (e.g., the sun, a hot computer chassis, etc.), the PTC element 64 and/or the PTC element 66 may exhibit high electrical resistance and may arrest current flowing through the D+ data conductor 54 and/or the D− data conductor 56, respectively. Thus, the D+ data conductor 54 and/or the D− data conductor 56 will appear to the source 60 to be "open" (i.e., disconnected), thereby causing the source 60 to default to low power operation and will apply 5V on the power conductor 58. High power operation is therefore prevented when the cable 50 is in an overheated state, thereby mitigating damage that might otherwise result if the cable were allowed to transmit high power.

When the PTC element 64 and/or the PTC element 66 cools down to a temperature below its trip temperature and becomes electrically conductive again, the D+ data conductor 54 and/or the D− data conductor 56 will appear to the source 40 and to the sink 42 to be "closed" (i.e., connected), and conventional operation of the cable 50 may resume. The PTC elements 64, 66 thus act as resettable fuses that mitigate overheating in the cable 50 to prevent thermal damage thereto. Advantageously, since the PTC elements 64, 66 are implemented on the D+ data conductor 54 and the D− data conductor 56 and not on the power conductor 58, the PTC elements 64, 66 need only be rated to hold nominal electrical currents (e.g., 8 milliamps) transmitted on the D+ data conductor 54 and the D− data conductor 56 regardless of the amount of current transmitted on the power conductor 58 (e.g., 3 amps). The PTC elements 64, 66 may therefore be small and inexpensive, making the cost and the size of the cable 50 commercially practical.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A cable comprising:
a power conductor configured to transmit electrical power between a first device and a second device;
a first data conductor configured to transmit data between the first device and the second device; and
a first positive temperature coefficient (PTC) element coupled to the first data conductor and configured to mitigate current flowing through the data conductor if a temperature of the first PTC element rises above a predefined first trip temperature, wherein the opening of the data line indicates a fault condition to a device to which the cable is connected, whereby electrical power flowing through the power conductor is resultantly mitigated.

2. The cable of claim 1, wherein the first PTC element is configured to be connected electrically in series with the first device and the second device when the cable is connected to the first device and the second device.

3. The cable of claim 1, wherein the first data conductor is a configuration channel (CC) conductor configured to allow the first device and the second device to determine whether a connection has been established via the cable.

4. The cable of claim 1, wherein the first data conductor is rated to handle a maximum of 330 microamps.

5. The cable of claim 1, wherein the first PTC element has a resistance that increases in a non-linear fashion when a temperature of the first PTC element exceeds the predefined first trip temperature.

6. The cable of claim 1 further comprising:
a second data conductor configured to transmit data between the first device and the second device; and
a second PTC element coupled to the second data conductor and configured to mitigate current flowing through the second data conductor if a temperature of the second PTC element rises above a predefined second trip temperature.

7. The cable of claim 1, further comprising:
a Vconn conductor configured to facilitate high power operation of the cable, the Vconn conductor having an integrated circuit coupled thereto configured to indicate that the cable is configured to handle high power; and
a second PTC element coupled to the Vconn conductor and configured to mitigate current flowing through the Vconn conductor if a temperature of the second PTC element rises above a predefined second trip temperature.

8. The cable of claim 7, wherein the second PTC element is configured to be connected electrically in series with the first device and the second device when the cable is connected to the first device and the second device.

9. The cable of claim 7, wherein the second trip temperature is lower than the first trip temperature.

10. The cable of claim 1, wherein the cable conforms to a universal serial bus (USB) Type-C standard.

11. A system for providing over-temperature protection comprising:
a first device and a second device connected to one another by the cable;
wherein the cable comprises:
a power conductor configured to transmit electrical power between the first device and the second device;
a first data conductor configured to transmit data between the first device and the second device; and
a first positive temperature coefficient (PTC) element coupled to the first data conductor and configured to mitigate current flowing through the first data conductor if a temperature of the first PTC element rises above a predefined first trip temperature;

wherein at least one of the first device and the second device is configured to reduce an amount of electrical power transmitted via the power conductor upon mitigation of the current flowing through the first data conductor.

12. The system of claim 11, wherein the first PTC element is connected electrically in series with the first device and the second device.

13. The system of claim 11, wherein the first data conductor is a configuration channel (CC) conductor configured to allow the first device and the second device to determine whether a connection has been established via the cable.

14. The system of claim 11, further comprising a second positive temperature coefficient (PTC) element coupled to a data conductor of one of the first device and the second device and configured to mitigate current flowing through the data conductor if a temperature of the second PTC element rises above a predefined first trip temperature, wherein at least one of the first device and the second device is configured to reduce an amount of electrical power transmitted via the power conductor upon mitigation of the current flowing through the data conductor.

15. The system of claim 11, wherein the first PTC element has a resistance that increases in a non-linear fashion when a temperature of the first PTC element exceeds the predefined first trip temperature.

16. The system of claim 11 further comprising:
a second data conductor configured to transmit data between the first device and the second device; and
a second PTC element coupled to the second data conductor and configured to mitigate current flowing through the second data conductor if a temperature of the second PTC element rises above a predefined second trip temperature;

wherein at least one of the first device and the second device is configured to reduce an amount of electrical power transmitted via the power conductor upon mitigation of the current flowing through the second data conductor.

17. The system of claim 11, further comprising:
a Vconn conductor configured to facilitate transmission of a high power via the power conductor, the Vconn conductor having an integrated circuit coupled thereto and configured to indicate to at least one of the first device and the second device that the cable is configured to handle high power; and
a second PTC element coupled to the Vconn conductor and configured to mitigate current flowing through the Vconn conductor if a temperature of the second PTC element rises above a predefined second trip temperature;

wherein at least one of the first device and the second device is configured to limit transmission of electrical power via the power conductor to a low power that is less than the high power if current flowing through the Vconn conductor is mitigated.

18. The system of claim 17, wherein the second PTC element is connected electrically in series with the first device and the second device.

19. The system of claim 17, wherein the second trip temperature is lower than the first trip temperature.

20. The system of claim 11, wherein the cable conforms to a universal serial bus (USB) Type-C standard.

* * * * *